United States Patent
Sun

(10) Patent No.: US 8,351,196 B2
(45) Date of Patent: Jan. 8, 2013

(54) HARD DISK DRIVE BRACKET

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 125 days.

(21) Appl. No.: 13/090,235

(22) Filed: Apr. 19, 2011

(65) Prior Publication Data

US 2012/0250244 A1    Oct. 4, 2012

(30) Foreign Application Priority Data

Mar. 31, 2011    (CN) .......................... 2011 1 0080361

(51) Int. Cl.
*G06F 1/16* (2006.01)
*H05K 5/00* (2006.01)
*H05K 7/00* (2006.01)

(52) U.S. Cl. ................................. 361/679.33

(58) Field of Classification Search .................. 361/685, 361/679.33, 679.39
See application file for complete search history.

(56) References Cited

U.S. PATENT DOCUMENTS

| | | | |
|---|---|---|---|
| 6,683,785 B1 * | 1/2004 | Chen | 361/679.33 |
| 7,306,224 B2 * | 12/2007 | Munoz | 273/142 R |
| 7,319,585 B2 * | 1/2008 | Chou | 361/679.33 |
| 7,443,667 B2 * | 10/2008 | Guo et al. | 361/679.33 |
| 7,477,511 B2 * | 1/2009 | Hsu et al. | 361/679.37 |
| 7,492,586 B2 * | 2/2009 | Peng et al. | 361/679.33 |
| 7,542,280 B2 * | 6/2009 | Hong et al. | 361/679.33 |
| 7,684,181 B2 * | 3/2010 | Peng et al. | 361/679.33 |
| 2006/0139871 A1 * | 6/2006 | Chen et al. | 361/685 |
| 2007/0035920 A1 * | 2/2007 | Peng et al. | 361/685 |
| 2007/0211422 A1 * | 9/2007 | Liu et al. | 361/685 |
| 2007/0230105 A1 * | 10/2007 | Su | 361/685 |
| 2008/0094794 A1 * | 4/2008 | Hass | 361/685 |
| 2008/0253078 A1 * | 10/2008 | Neukam | 361/685 |
| 2008/0266781 A1 * | 10/2008 | Olesiewicz et al. | 361/685 |
| 2009/0059509 A1 * | 3/2009 | Peng et al. | 361/685 |
| 2009/0086421 A1 * | 4/2009 | Olesiewicz et al. | 361/679.33 |
| 2009/0129009 A1 * | 5/2009 | Zhang et al. | 361/679.34 |
| 2009/0224115 A1 * | 9/2009 | Zhang et al. | 248/201 |
| 2009/0230277 A1 * | 9/2009 | Peng et al. | 248/544 |
| 2009/0316349 A1 * | 12/2009 | Olesiewicz et al. | 361/679.33 |
| 2010/0001157 A1 * | 1/2010 | Chen et al. | 248/306 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A hard disk drive (HDD) bracket for fixing a HDD includes an arm, a frame pivotably connected to the arm, a handle mounted to the frame, and a fixing member slidably attached to the arm and capable of engaging with both of the handle and the arm.

6 Claims, 5 Drawing Sheets

HARD DISK DRIVE BRACKET

BACKGROUND

1. Technical Field

The present disclosure relates to a hard disk drive (HDD) bracket for mounting an HDD.

2. Description of Related Art

Hard disk drives (HDDs) are generally received in brackets first, and then received in a rack of a chassis. In most case, HDDs are fixed to the brackets with screws, which is inconvenient and time-consuming for assembly or disassembly.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
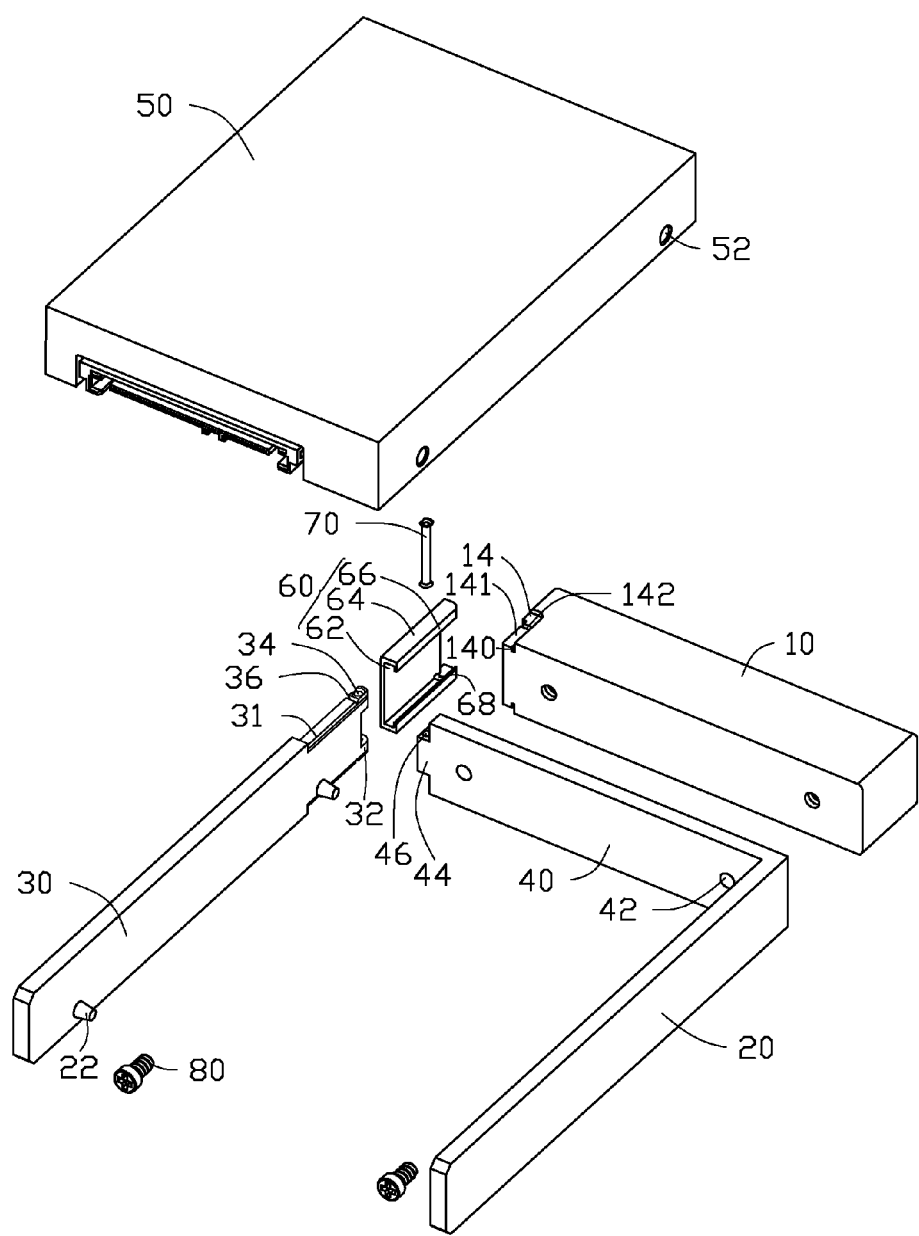
FIG. 1 is an exploded, isometric view of an exemplary embodiment of a hard disk drive (HDD) bracket, together with an HDD.

Referring to FIG. 1, an exemplary embodiment of a hard disk drive (HDD) bracket for fixing a HDD 50 includes a handle 10, a first arm 30, an L-shaped frame, and a fixing member 60.

The HDD 50 defines two fixing holes 52 in each of opposite sides of the HDD 50.

The L-shaped frame includes a connection arm 40 and a second arm 20 perpendicularly extending rearward from a first end of the connection arm 40. The connection arm 40 defines two through holes 42 in the first end and a second end opposite to the first end, respectively. A protrusion 44 protrudes from the second end of the connection arm 40 away from the second arm 20. The protrusion 44 defines a pivot hole 46 therein from top to bottom. Two pins 22 extend from an inner surface of each of the first and second arms 30 and 20, corresponding to fixing holes 52 of the HDD 50.

The handle 10 is mounted to an outer surface of the connection arm 40, it is substantially bar-shaped and has a first end and an opposite second end (not labeled). An installing portion 14 extends from the second end of the handle 10 opposite to the second arm 20. A top and a bottom of the installing portion 14 are recessed. Two slide slots 140 are respectively defined in bottoms of the recessed portions 141, adjacent to a rear side of the handle 10, and two slots 142 respectively defined in the bottoms of the recessed portions 141, perpendicular to the slide slots 140. The cross-section of each slot 142 is substantially semicircular.

An attaching portion 31 is formed at a front end of the first arm 30. Two tabs 32 extend forward from upper and lower portions of the front end of the attaching portion 31. Two pivot holes 34 in alignment to each other are respectively defined in the tabs 32. A semicircular slot 36 is defined in each of a top and a bottom of the attaching portion 31, at a side of a corresponding tab 32.

The fixing member 60 is substantially U-shaped in cross-section, and includes a connection plate 62, and two extension plates 64 substantially perpendicularly extend from a top and a bottom of the connection plate 62 in the same direction. Two blocking plates 66 substantially extend from the extension plates 64 towards each other. An antiskid portion 620 (shown in FIG. 3) is formed on an outer surface of the connection plate 62 opposite to the extension plates 64, for conveniently operating the fixing member 60. An engaging portion 68 protrudes from a front end of each extension plate 64 toward the other extension plate 64. The cross-section of each engaging portion 68 is substantially semicircular.

Figure 2:
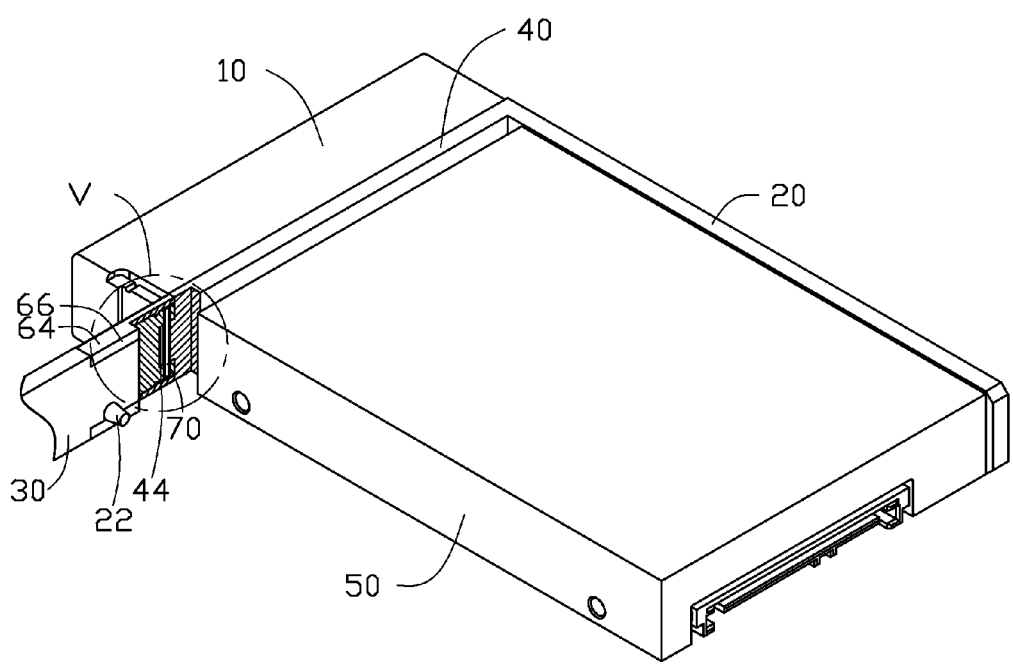
FIGS. 2 and 3 are partially assembled, isometric views the HDD bracket of FIG. 1, showing different states of use, with FIG. 2 containing a portion of cutaway view.

Referring to FIG. 2, in assembly, the protrusion 44 of the connection arm 40 is positioned between the tabs 32 of the first arm 30. A shaft 70 pivotably extends through the pivot hole 34 of one of the tabs 32, the pivot hole 46 of the protrusion 44, and the pivot hole 46 of the other tab 32, to pivotably mount the first arm 30 to the connection arm 40. The fixing member 60 is slidably attached to the attaching portion 31 of the first arm 30. At this time, the engaging portions 68 are engaged in the corresponding slots 36 of the attaching portion 31. Two screws 80 respectively extend through the through holes 42 of the connection arm 40 and engage in the handle 10, to fix the handle 10 to the connection arm 40.

Figure 3:
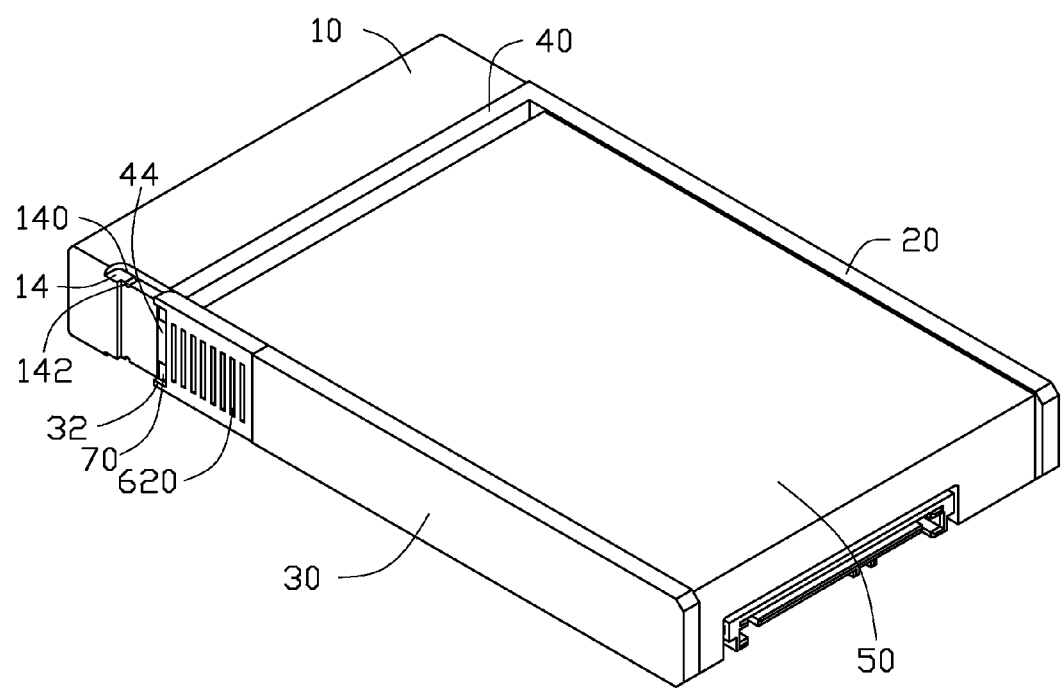
Figure 4:
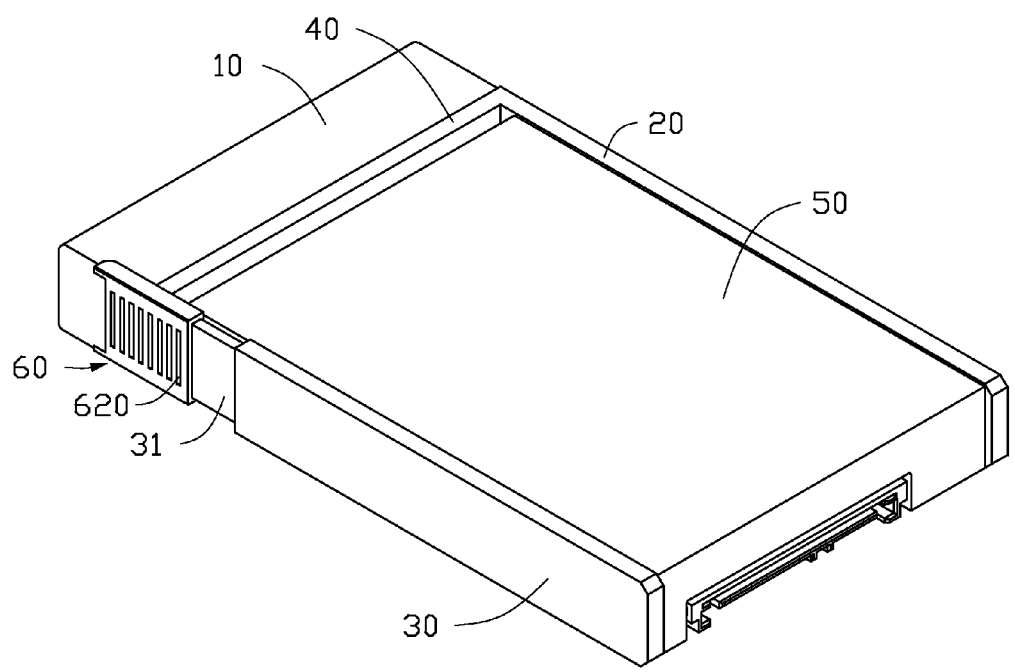
FIG. 4 is an assembled, isometric view of FIG. 1.
Figure 5:
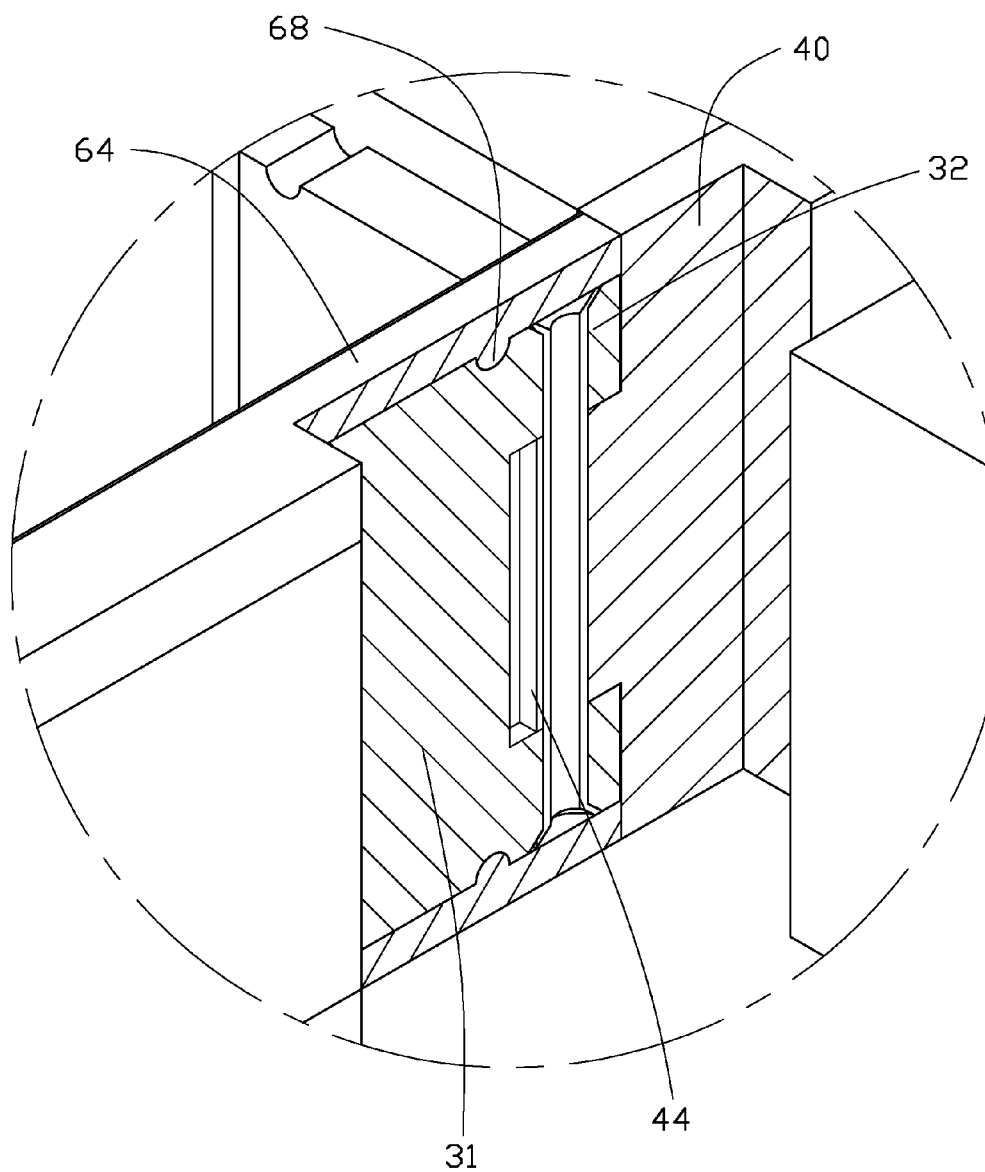
FIG. 5 is an enlarged view of the circled portion V of FIG. 2.

Referring to FIGS. 3, 4 and 5, in mounting the HDD 50, the first arm 30 is pivoted away from the second arm 20 about the shaft 70. The HDD 50 is attached to the second arm 20, with the pins 22 of the second arm 20 engaging in the fixing holes 52 in a first side of the HDD 50. The first arm 30 is pivoted toward a second side of the HDD 50 opposite to the second arm 20, and the pins 22 of the first arm 30 are engaged in the fixing holes 52 in the second side of the HDD 50. The fixing member 60 is slid toward the handle 10, until the engaging portions 68 are engaged in the corresponding slots 142 of the installing portion 14. Thereby, parts of the blocking plates 66 of the fixing member 60 are engaged in the corresponding slide slots 140 of the installing portion 14. A part of the connection plate 62 contacts an outer surface of the installing portion 14 of the handle 10, and the other part of the fixing member 60 is still attached to the attaching portion 31 of the first arm 30, for preventing the first arm 30 from pivoting about the shaft 70.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A hard disk drive (HDD) bracket, comprising:
   a connection arm;
   a first arm extending rearward from a first end of the connection arm;
   a second arm pivotably connected to a second end of the connection arm opposite to the first end;
   a handle mounted to the connection arm opposite to the first and second arms; and a fixing member slidably mounted to the second arm, and operable to engage with both of the handle and the second arm to prevent the second arm from pivoting about the connection arm.

2. The HDD bracket of claim 1, wherein a protrusion protrudes from the second end of the connection arm, two tabs extend from a front end of the second arm, a shaft pivotably extends through one of the tabs, the protrusion, and the other tab to pivotably mount the second arm to the connection arm.

3. The HDD bracket of claim 2, wherein the second arm comprises an attaching portion, from where the tabs extend forward, the tabs each define a first slot, the fixing member comprises a connection plate, two extension plates extending from top and bottom of the connection plate, and two blocking plates extend from the plates toward each other, an engaging portion protrudes from an inner surface of each extension plate to engage in the first slot of the corresponding tab.

4. The HDD bracket of claim 3, wherein an installing portion is formed on an end of the handle for engaging with the fixing member, two slide slots are defined in top and bottom of the installing portion for receiving the corresponding blocking plates of the fixing member, two second slots are defined in the top and bottom of the installing portion for engaging with the corresponding engaging portions of the fixing member in response to the fixing member engaging with both of the handle and the second arm.

5. The HDD bracket of claim 3, wherein an antiskid portion is formed on an outer surface of the connection plate of the fixing member.

6. The HDD bracket of claim 2, wherein two pins extend from an inner side of each of the first and second arms, to engage in a corresponding side of the HDD.

\* \* \* \* \*